United States Patent
Cripe et al.

(10) Patent No.: US 10,153,555 B1
(45) Date of Patent: Dec. 11, 2018

(54) SYSTEMS AND METHODS FOR SWITCHED RELUCTANCE MAGNETIC MECHTENNA

(71) Applicant: Rockwell Collins, Inc., Cedar Rapids, IA (US)

(72) Inventors: David W. Cripe, Mount Vernon, IA (US); Bryan S. McCoy, Windsor Heights, IA (US); Jeffrey L. Box, Farmersville, TX (US)

(73) Assignee: ROCKWELL COLLINS, INC., Cedar Rapids, IA (US)

( * ) Notice: Subject to any disclaimer, the term of this patent is extended or adjusted under 35 U.S.C. 154(b) by 0 days.

(21) Appl. No.: 15/636,363

(22) Filed: Jun. 28, 2017

(51) Int. Cl.
*H01Q 9/06* (2006.01)
*H01F 1/053* (2006.01)

(52) U.S. Cl.
CPC .............. *H01Q 9/06* (2013.01); *H01F 1/053* (2013.01)

(58) Field of Classification Search
CPC ...................................................... H01Q 9/06
USPC ...................................................... 343/787
See application file for complete search history.

(56) References Cited

U.S. PATENT DOCUMENTS

2009/0027280 A1* 1/2009 Frangioni .......... A61K 49/0032
343/703

* cited by examiner

*Primary Examiner* — Andrea Lindgren Baltzell
(74) *Attorney, Agent, or Firm* — Donna P. Suchy; Daniel M. Barbieri

(57) ABSTRACT

An antenna assembly includes a rotor, a first end component, and a second end component. The rotor includes a rotor body and a plurality of magnets configured to output a first magnetic field. The rotor body defines a plurality of slots extending radially inward from an exterior surface of the rotor body. Each magnet is disposed in a corresponding slot. The first end component includes a first end component body and a plurality of first extensions extending from the first end component body and contacting a first set of the plurality of magnets. The second end component includes a second end component body and a plurality of second extensions extending from the second end component body and contacting the first set. The first end component and the second end component are configured to output an electromagnetic signal.

20 Claims, 6 Drawing Sheets

SYSTEMS AND METHODS FOR SWITCHED RELUCTANCE MAGNETIC MECHTENNA

BACKGROUND

The inventive concepts disclosed herein relate generally to the field of antennas. More particularly, embodiments of the inventive concepts disclosed herein relate to a switched reluctance antenna for transmitting very low frequency and ultra low frequency radio signals.

Existing antennas for low frequency transmissions are generally impractical because of the required antenna size. To efficiently generate very low frequency radiation has required an antenna subtending a large fraction of a wavelength, extending thousands of feet. For example, a 1 kHz transmission has a corresponding wavelength of 300 km, indicating a general size range for an antenna producing such a transmission. While some airborne platforms have been developed to incorporate a trailing antenna having a length of approximately five miles, such a design would not be feasible for most applications, including ground-based antennas. In addition, electrically small antennas (e.g., having a size dimension corresponding to one tenth of the desired carrier frequency) have relatively low radiation resistance, and thus have poor efficiency due to ohmic losses resulting from the relatively great excitation currents required to overcome the radiation resistance, making electrically small antennas ineffective for low frequency transmissions.

SUMMARY

In one aspect, the inventive concepts disclosed herein are directed to an antenna assembly. The antenna assembly includes a rotor, a plurality of magnets, a first end component, and a second end component. The rotor includes a first rotor end and a second rotor end. The plurality of magnets is associated with the rotor and configured to output a first magnetic field. A first set of the plurality of magnets has a north pole adjacent to the first rotor end. A second set of the plurality of magnets has a south pole adjacent to the first rotor end. The first set and the second set are arranged in an alternating order about the rotor. The first end component includes a first end component body and a plurality of first extensions extending from the first end component body. The first end component includes a ferromagnetic material. The first end component is disposed such that the plurality of first extensions are spaced from the first set of the plurality of magnets by a first distance less than a first threshold. The second end component includes a second end component body and a plurality of second extensions extending from the second end component body. The second end component has a ferromagnetic material. The second end component is disposed such that the plurality of second extensions are spaced from the first set of the plurality of magnets by a second distance less than a second threshold. The first end component and the second end component are configured to output an electromagnetic signal based on the first magnetic field.

In a further aspect, the inventive concepts disclosed herein are directed to an antenna system. The antenna system includes a rotor, a plurality of magnets, a first end component, a second end component, and a drive system. The rotor includes a first rotor end and a second rotor end. The plurality of magnets are associated with the rotor and configured to output a first magnetic field. A first set of the plurality of magnets have a north pole adjacent to the first rotor end. A second set of the plurality of magnets have a south pole adjacent to the first rotor end. The first set and the second set are arranged in an alternating order about the rotor. The first end component includes a ferromagnetic material. The second end component includes a ferromagnetic material. The first end component and the second end component are configured to output an electromagnetic signal based on the first magnetic field. The drive system includes an electromagnet system configured to output a second magnetic field to drive rotation of the rotor relative to the first end component and the second end component. The drive system includes a drive control circuit configured to control operation of the electromagnetic system based on a control signal.

In a further aspect, the inventive concepts disclosed herein are directed to a method. The method includes generating, by a control circuit, a control signal having a signal frequency. The method includes transmitting the control signal to a drive system having a plurality of electromagnets to cause the drive system to pass an electric current through the plurality of electromagnets at a rotational frequency corresponding to the signal frequency to generate a drive magnetic field. The method includes rotating a rotor using the drive magnetic field. The rotor is associated with a plurality of magnets. A first set of the plurality of magnets having a north pole adjacent to a first rotor end of the rotor and a second set of the plurality of magnets having a south pole adjacent to a second rotor end of the rotor. The method includes outputting a rotor magnetic field by the plurality of magnets. The method includes conducting magnetic flux of the rotor magnetic field through a plurality of extensions into a first end component and a second end component. The method includes outputting an electromagnetic signal based on the rotor magnetic field.

BRIEF DESCRIPTION OF THE DRAWINGS

Implementations of the inventive concepts disclosed herein may be better understood when consideration is given to the following detailed description thereof. Such description makes reference to the included drawings, which are not necessarily to scale, and in which some features may be exaggerated and some features may be omitted or may be represented schematically in the interest of clarity. Like reference numerals in the drawings may represent and refer to the same or similar element, feature, or function. In the drawings.

DETAILED DESCRIPTION

Figure 1A:
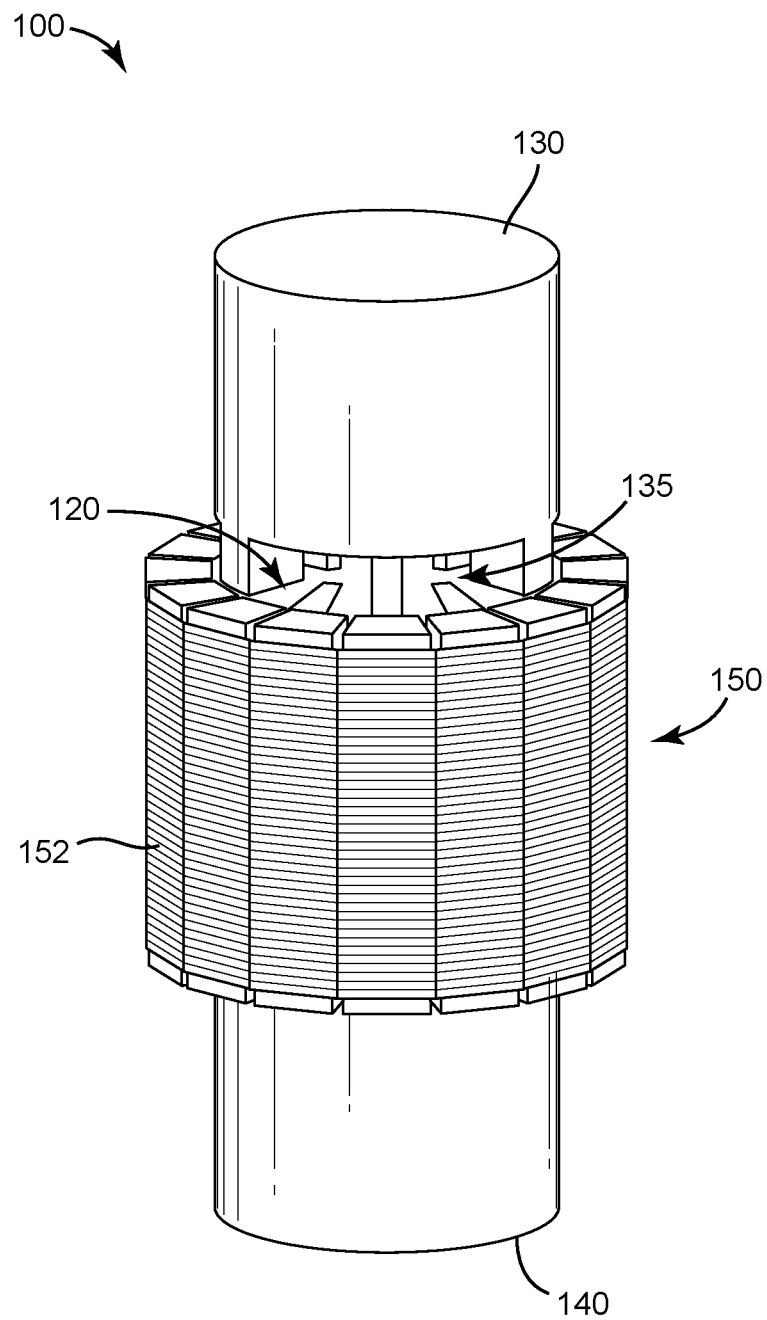
FIG. 1A is a perspective view of an exemplary embodiment an antenna assembly according to the inventive concepts disclosed herein.

Before explaining at least one embodiment of the inventive concepts disclosed herein in detail, it is to be understood that the inventive concepts are not limited in their application to the details of construction and the arrangement of the components or steps or methodologies set forth in the following description or illustrated in the drawings. In the following detailed description of embodiments of the instant inventive concepts, numerous specific details are set forth in order to provide a more thorough understanding of the inventive concepts. However, it will be apparent to one of ordinary skill in the art having the benefit of the instant disclosure that the inventive concepts disclosed herein may be practiced without these specific details. In other instances, well-known features may not be described in detail to avoid unnecessarily complicating the instant disclosure. The inventive concepts disclosed herein are capable of other embodiments or of being practiced or carried out in various ways. Also, it is to be understood that the phraseology and terminology employed herein is for the purpose of description and should not be regarded as limiting.

As used herein a letter following a reference numeral is intended to reference an embodiment of the feature or element that may be similar, but not necessarily identical, to a previously described element or feature bearing the same reference numeral (e.g., 1, 1a, 1b). Such shorthand notations are used for purposes of convenience only, and should not be construed to limit the inventive concepts disclosed herein in any way unless expressly stated to the contrary.

Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), or both A and B are true (or present).

In addition, use of the "a" or "an" are employed to describe elements and components of embodiments of the instant inventive concepts. This is done merely for convenience and to give a general sense of the inventive concepts, and "a" and "an" are intended to include one or at least one and the singular also includes the plural unless it is obvious that it is meant otherwise.

Finally, as used herein any reference to "one embodiment" or "some embodiments" means that a particular element, feature, structure, or characteristic described in connection with the embodiment is included in at least one embodiment of the inventive concepts disclosed herein. The appearances of the phrase "in some embodiments" in various places in the specification are not necessarily all referring to the same embodiment, and embodiments of the inventive concepts disclosed may include one or more of the features expressly described or inherently present herein, or any combination or sub-combination of two or more such features, along with any other features which may not necessarily be expressly described or inherently present in the instant disclosure.

Broadly, embodiments of the inventive concepts disclosed herein are directed to systems and methods for low frequency antennas, such as for transmitting radio signals in the very low frequency ("VLF") or ultra low frequency ("ULF") spectra. The inventive concepts disclosed herein can be utilized in a number of applications, stationary antennae, ground-based antennae, underwater transmissions, and transmissions through solid rock.

In some embodiments, an antenna assembly includes a rotor, a plurality of magnets, a first end component, and a second end component. The rotor includes a first rotor end and a second rotor end. The plurality of magnets is associated with the rotor and configured to output a first magnetic field. A first set of the plurality of magnets has a north pole adjacent to the first rotor end. A second set of the plurality of magnets has a south pole adjacent to the first rotor end. The first set and the second set are arranged in an alternating order about the rotor. The first end component includes a first end component body and a plurality of first extensions extending from the first end component body. The first end component includes a ferromagnetic material. The first end component is disposed such that the plurality of first extensions are spaced from the first set of the plurality of magnets by a first distance less than a first threshold. The second end component includes a second end component body and a plurality of second extensions extending from the second end component body. The second end component has a ferromagnetic material. The second end component is disposed such that the plurality of second extensions are spaced from the first set of the plurality of magnets by a second distance less than a second threshold. The first end component and the second end component are configured to output an electromagnetic signal based on the first magnetic field.

Embodiments of the inventive concepts disclosed herein can improve operation of antenna systems by enabling operation in the VLF or ULF spectra. This can allow radio transmissions in critical or previously impossible implementations, such as after a nuclear explosion, through seawater, or through solid rock, due to the advantageous low propagation losses of VLF or ULF signals. As compared to existing rare-earth magnet systems, which are prone to mechanical failure due to the forces required to rotate the magnets, embodiments of the inventive concepts disclosed herein can enable mobile or portable applications by reducing the rotational frequency needed to achieve VLF or ULF transmission frequencies.

Referring to FIGS. 1A-1D, an antenna assembly 100 is shown according to an exemplary embodiment of the inventive concepts disclosed herein. The antenna assembly 100 includes a rotor 120, a first end component 130 (e.g., emitter, rotor cap, pole), and a second end component 140 (e.g., emitter, rotor cap, pole).

The rotor 120 includes a first rotor end 121, a second rotor end 122, and a rotor body 123 extending between the first rotor end 121 and the second rotor end 122. The first rotor end 121 is disposed adjacent to the first end component 130. The second rotor end 122 is disposed adjacent to the second end component 140. The first end component 130 may be supported on the rotor 120, while the rotor 120 is supported on the second end component 140. In some embodiments, the antenna assembly 100 includes a frame or shaft assembly (not shown) configured to align and/or support the rotor 120, first end component 130, and second end component 140 such that the rotor 120 may rotate while first rotor end 121 is disposed adjacent to (e.g., in contact with) the first end component 130 and the second rotor end 122 is disposed adjacent to the second end component 130. The frame may include bearings to facilitate rotation of the rotor 120. The frame may include an adjustment mechanism configured to adjust a distance between the end components 130 or 140 and the rotor 120 (e.g., a Vernier adjustment feature) with relatively high accuracy, such as to balance attractive forces between the magnetic components while reducing bearing forces to maximize system efficiency and longevity. The first end component 130 and second end component 140 may be fixed in position (e.g., fixed in absolute position or relative to one another) while the rotor 120 rotates relative to the first end component 130 and the second end component 140. The rotor body 123 can be cylindrical.

The rotor body 123 can be made of a non-ferromagnetic material and non-conductive material, such as aluminum, so that the rotor body 123 itself does not magnetically interact with other components such as the end components 130, 140. For example, the rotor body 123 can be configured such that magnetic fields generated by the magnets (e.g., magnets 127) do not interact with planes or closed paths of conductive material orthogonal to rotation axis 124. The rotor body 123 can be made of a ceramic material. The rotor body 123 can be made of a composite polymer material. The material of the rotor body 123 may be selected to have a strength (e.g., tensile strength) exceed a strength threshold associated with stress on the rotor 120 due to rotation of the rotor 120, such as due to centripetal forces associated with rotating the rotor 120 so that the antenna assembly 100 can generate VLF or ULF radiation. The strength threshold may be a function of the density or mass of the rotor 120 (including the plurality of magnets 127) and the expected rate of rotation of the rotor 120. The rotor body 123 may include ceramic materials, such as silicon nitride, having a tensile strength of approximately 500 MPa; however, ceramic materials may be difficult to machine into the desired shape for the rotor body 123. The rotor body 123 may include composite materials (e.g., PEEK; Celazole) having tensile strengths of approximately 100 MPa, which may be injection molded to minimize machining operations for fabricating the rotor body 123.

In some embodiments, the rotor body 123 defines a plurality of slots 125. The slots 125 extend inward from an exterior surface 126 of the rotor body 123. The slots 125 extend from the first rotor end 121 to the second rotor end 122. The slots 125 can have a wedge shape (e.g., a width of the slot 125 at the exterior surface 126 is greater than a width of the slot 125 at an inward end of the slot 125). The plurality of slots 125 are configured to receive a corresponding plurality of magnets 127, as will be described herein. In some embodiments, the plurality of magnets 127 may be associated with the rotor 120 by being coupled to the rotor 120 (e.g., directly coupled to a surface of the rotor 120; coupled to the rotor 120 via a frame or rails).

The rotor 120 includes a plurality of magnets 127 configured to output or generate a magnetic field (e.g., a first magnetic field; a rotor magnetic field). Each magnet 127 includes a first magnetic pole (e.g., north pole) and a second magnetic pole (e.g., south pole). Each magnet 127 can generate a correspond magnetic field, such that the magnetic field corresponds to a sum of the magnetic fields generated by the magnets 127. The magnets 127 can have an axially oriented polarization, such that an axis extending from the north pole to the south pole is parallel to an axis of rotation of the rotor 120 (e.g., rotation axis 124). The magnets 127 are positioned with alternating polarities, such that a first magnet 127 has a north pole adjacent to the first end component 130, while an adjacent, second magnet 127 has a south pole adjacent to the first end component 130, facilitating the generation of an alternating electromagnetic signal as described herein. The magnets 127 can be spaced radially outward from the rotor 120.

Figure 1B:
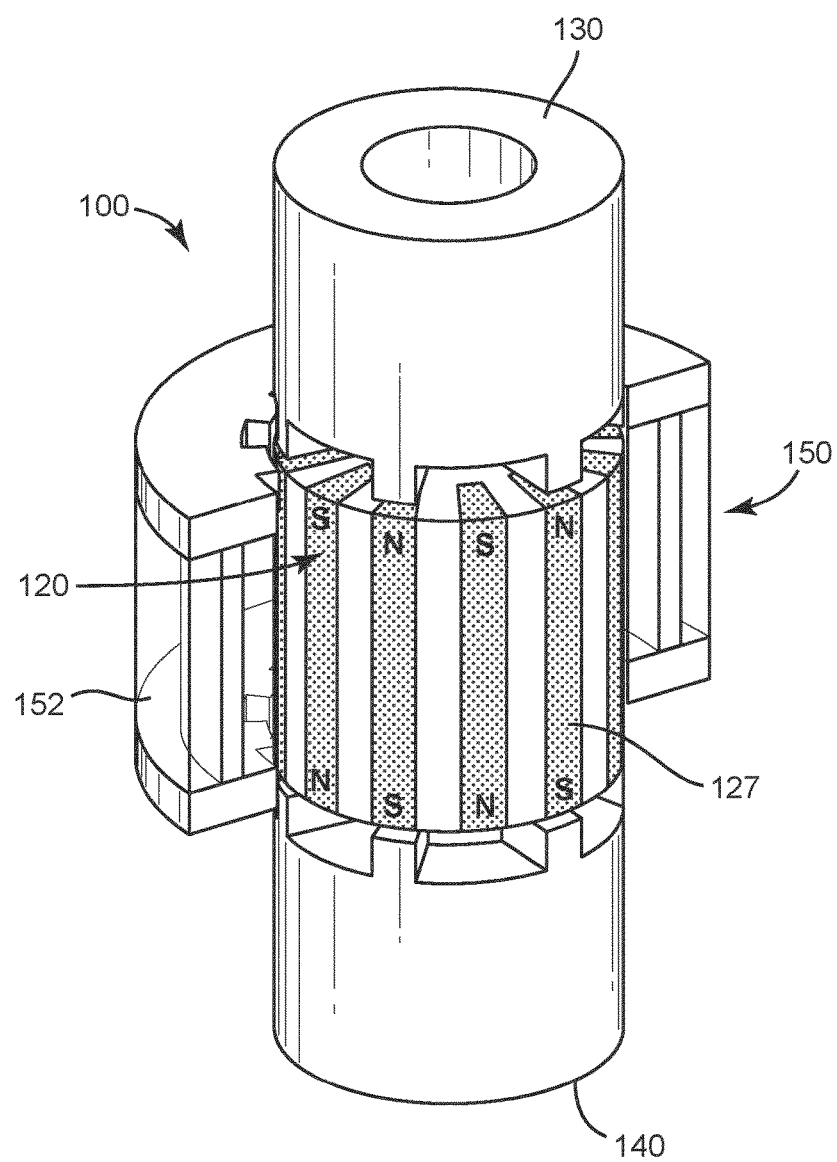
FIG. 1B is a partial perspective view of the antenna assembly of FIG. 1A.
Figure 1C:
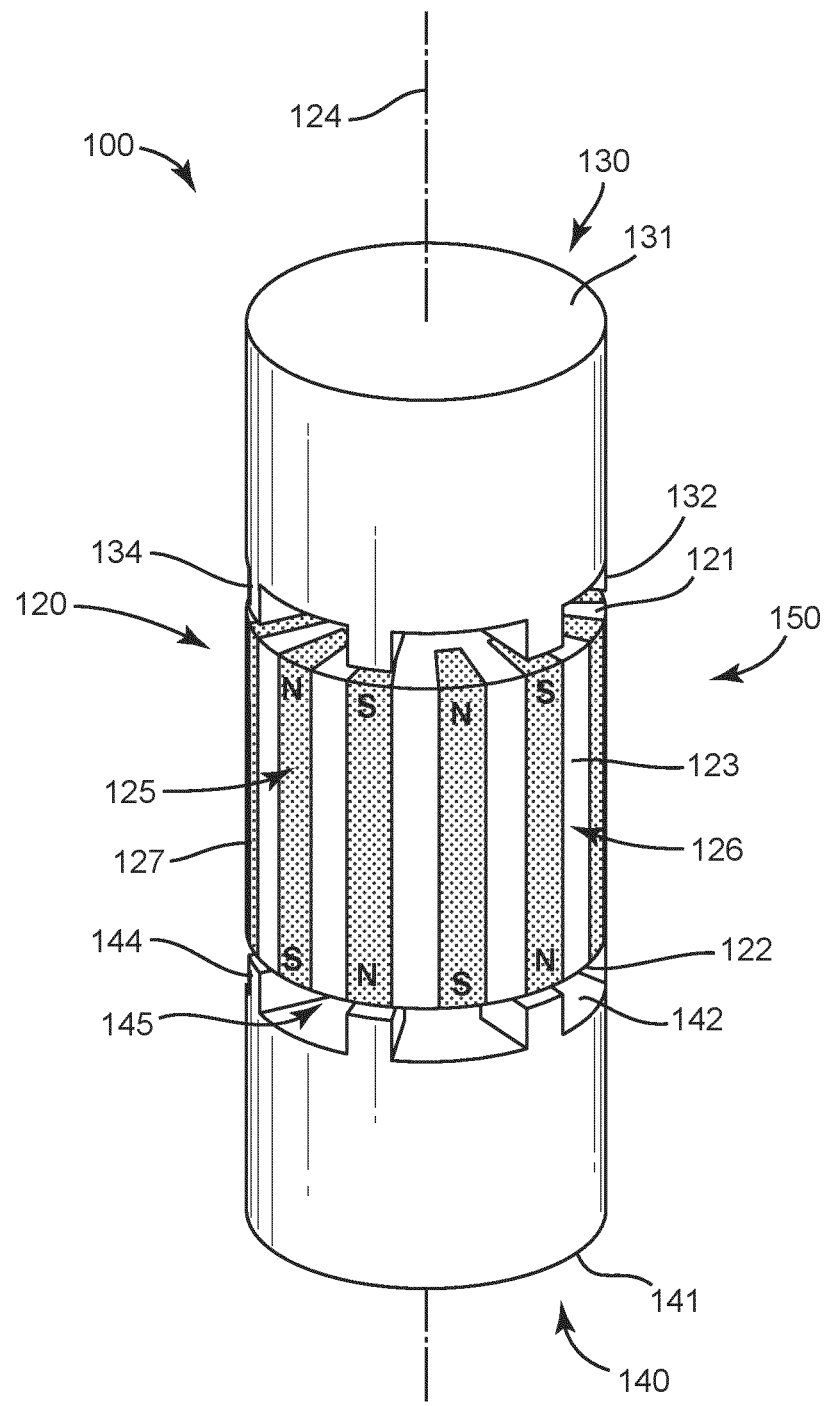
FIG. 1C is a perspective view a rotor and ends of the antenna assembly of FIG. 1A.
Figure 1D:
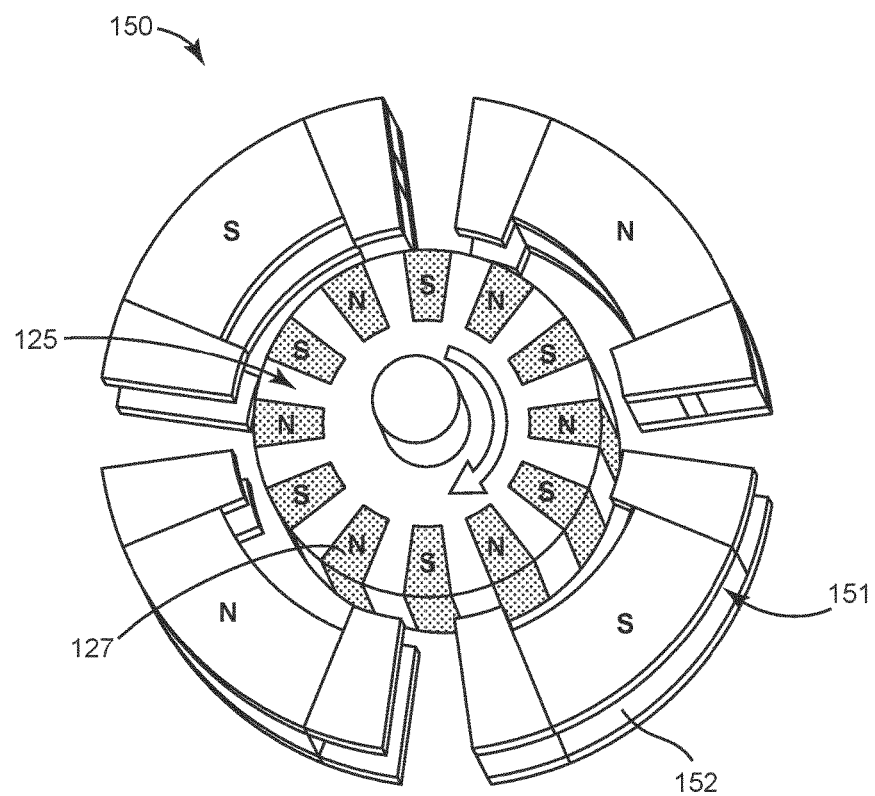
FIG. 1D is a top perspective view of the rotor and a drive system of the antenna assembly of FIG. 1A.

While FIGS. 1A-1B illustrate the slots 125 and corresponding magnets 127 as extending along a length of the exterior surface 126 of the rotor 120 from the first rotor end 121 to the second rotor end 122, in some embodiments, the magnets 127 may have discrete elements. For example, as compared to each magnet 127 which is configured as a single element, in some embodiments, a pair of magnets may be provided, a first magnet of the pair being disposed in a corresponding slot adjacent to the first rotor end, and a second magnet of the pair being disposed in a corresponding slot adjacent to the second rotor end.

The magnets 127 are made of a ferromagnetic material. The magnets can be made of a rare earth material. In some embodiments, the magnets 127 include at least one of an element in the lanthanide series, scandium, or yttrium. In some embodiments, the use of rare earth elements for the magnets enable generation of a magnetic field having a relatively large magnitude (e.g., on the order of or greater than 1 Tesla) which may be necessary in various applications for desired transmission distances and/or transmission signal strength. The magnets 127 may be made of neodymium (e.g., an NdFeB alloy magnet).

While FIGS. 1A-1B illustrate the rotor 120 as including ten magnets (five with north poles at the first rotor end 121, five with south poles at the first rotor end 121), it will be appreciated that the number of magnets (and corresponding slots 125) may be varied. For example, the rotor 120 may include at least four magnets 127, at least eight magnets 127, at least twenty magnets 127. The number of magnets 127 may be selected based on factors such as the mass of the magnets 127 and a power output rating of a drive system (e.g., drive system 150) for rotating the rotor 120, an expected or desired and an expected or desired signal strength for the antenna assembly 110. For example, as the mass of the magnets 127 increases, the signal strength of the electromagnetic signal outputted by the antenna assembly 110 will also increase, but the power required to rotate the rotor 120 will also increase. Similarly, as the expected or desired frequency of the electromagnetic signal increases, the number of magnets 127 may be increased, though there may be an increased power requirement associated with the greater number of magnets 127.

In some embodiments, the plurality of magnets 127 are arranged to have alternating orientations or polarizations. For example, a first set of the plurality of magnets 127 can have corresponding north poles at the first rotor end 121, and a second set of the plurality of magnets 127 can have corresponding north poles at the second rotor end 122. Each magnet 127 can be oriented to have an orientation opposite that of the adjacent magnets 127. For example, as shown in FIG. 1B, the orientations of the magnets 127 alternate sequentially around the rotor 120 such that a first magnet 127 has a north pole at the first rotor end 121 (and thus adjacent to the first end component 130), and the magnets 127 adjacent to the first magnet 127 have a south pole at the first rotor end 121. In some embodiments, the alternating orientations of the magnets 127 enable the antenna assembly 110 to generate an alternating magnetic field depending on the alignment of the rotor 120 with the end components 130, 140. Each magnet 127 may be spaced from the two adjacent magnets 127 by a distance approximately equal to a size (e.g., width or thickness) of the magnet 127. The plurality of magnets 127 can be configured to output a multipolar magnetic field source from which the radiated field of the end components 130, 140 is emitted.

The plurality of magnets 127 may be bonded to the rotor body 123 (e.g., bonded into the plurality of slots 125, using a bonding material such as an adhesive. In some embodiments, an expected shear stress between the plurality of magnets 127 and the corresponding plurality of slots 125 is on the order of 1-2 MPa. The bonding material may include an adhesive having a shear strength greater than the expected shear stress (e.g., Ablefillm 550 dry-film adhesive, which may attain shear strengths greater of approximately 30 MPa).

The first end component 130 and the second end component 140 are configured to generate or output an electromagnetic signal based on the magnetic field of the rotor. For example, the end components 130, 140 can be configured to output or generate a second magnetic field associated with the electromagnetic signal. The end components 130, 140 can be configured to conduct magnetic flux from the plurality of magnets 127 and output or generate the second magnetic field based on the conducted magnetic flux.

The end components 130, 140 can function as a radiating dipole. The end components 130, 140 can be configured to provide a magnetic dipole that sums the dipole moments of all like-oriented magnets 127 of the rotor 120. For example, in the configuration shown in FIG. 1B, the first end component 130, rotor 120, and second end component 140 are aligned such that, when arranged for the extensions 134 to contact the first rotor end 121 and the extensions 144 to contact the second rotor end 122, the first end component 130 will conduct magnetic flux from the south poles of a first set of the plurality of magnets 127 via the extensions 134, and the second end component 140 will conduct magnetic flux from the north poles of the first set of the plurality of magnets 127 via the extensions 144. As the rotor 120 rotates, the reluctance of the antenna assembly 110 (e.g., the direction by which the magnetic flux of the rotor 120 will conduct) will switch. For example, as the rotor 120 rotates clockwise (or counter-clockwise) from the configuration shown in FIG. 1B, the north poles of a second set of the plurality of magnets 127 will align with the extensions 134 of the first end component 130, such that the first end component 130 will conduct magnetic flux from the north poles of the second set of the plurality of magnets 127. In some such embodiments, a direction of the electromagnetic signal transmitted by the end components 130, 140 alternates as a function of angular position of the rotor 120.

In some embodiments, the first end component 130 is disposed such that the plurality of first extensions 134 are spaced from a first set (or second set) of the plurality of magnets 127 by a first distance less than a first threshold. The second end component 140 may be disposed such that the plurality of second extensions 144 are spaced from the first set of the plurality of magnets 127 by a second distance less than a second threshold. The first threshold and second threshold may be determined such that a magnitude of the electromagnetic signal outputted by the antenna assembly 100 is greater than a threshold magnitude, as decreasing the distance between the end components 130, 140 and the plurality of magnets 127 will increase a rate of magnetic flux conducting through the extensions 134, 144 into the end components 130, 140. The first distance and the second distance may be equal to one another. In some embodiments, the first distance and the second distance are zero (or vanishingly small, e.g. less than 1e-6 m; less than 1e-9 m), such that the extensions 134, 144 are disposed in contact with the plurality of magnets 127.

In some embodiments, the first end component 130 includes an outer first end component end 131, an inner first end component end 132, and a first end component body 133 between the outer first end component end 131 and the inner first end component end 132. The first end component 130 includes a plurality of extensions 134 extending from the first end component body 133 (e.g., from the inner first end component end 132). The plurality of extensions 134 are configured to conduct magnetic flux received from the plurality of magnets 127 of the rotor 120. The plurality of extensions 134 may have the same reluctance as the first end component body 133 (e.g., the plurality of extensions 134 may be constructed of the same material as the first end component body 133). In some embodiments, the plurality of extensions 134 are constructed as unitary or integral with the first end component body 133. In some embodiments, the plurality of extensions 134 are constructed separately from the first end component body 133 and mounted to the first end component body 133.

The second end component 140 can be similar to the first end component 130. For example, the second end component 140 can include an outer second end component end 141, an inner second end component end 142, and a second end component body 143 between the outer second end component end 141 and the inner second end component end 142. The second end component 140 can include a plurality of extensions 144 extending from the second end component body 143 (e.g., from the inner second end component end 142). The plurality of extensions 144 are configured to conduct magnetic flux from the plurality of magnets 127 of the rotor 120.

The plurality of extensions 134 define a first air gap 135. The plurality of extensions 134 each have a reluctance that is less than that of the first air gap 135, such that magnetic flux from the rotor 120 tends to be conducted through the extensions 134 at a greater rate than through the first air gap 135. For example, while magnetic flux may be directed from the magnets 127 closest to or in contact with the plurality of extensions 134, magnetic field lines from the alternate magnets 127 may return to the rotor 120 rather than extend into the first end component 130. The plurality of extensions 144 define a second air gap 145. The plurality of second extensions also each have a reluctance that is less than that of the second air gap 145, such that magnetic flux from the rotor 120 tends to be conducted through the extensions 144 at a greater rate than through the second air gap 145. The reluctance along a path from the plurality of magnets 127 to the plurality of extensions 134 (or the plurality of extensions 144) may less than or significantly less than (e.g., an order of magnitude less than) the reluctance along a path from the plurality of magnets 127 across the air gap 135 (or the air gap 145) to the end component 130 (or the end component 140).

In some embodiments, the plurality of extensions 134 are configured to cool the first end component 130. Operation of the antenna assembly 110 may result in heat to be generated by magnetic hysteresis in the plurality of extensions 134 or other parts of the first end component 130. The plurality of extensions 134 can be sized (e.g., extend by a length away from the inner first end component end 132; have a surface area to volume ratio) such that a flow rate of air through the first air gap 135 caused by rotation of the rotor 120, and the associated rate of convective heat transfer from the plurality of extensions 134 to the first air gap 135, is greater than a threshold rate of heat generation in the plurality of extensions 134. The plurality of extensions 144 may be similarly configured to cool the second end component 140. In some embodiments, the first end component 130 and/or the second end component 140 is hollow or otherwise has a relatively high surface area to volume ratio, facilitating convective cooling by the flow rate of air through corresponding air gaps 135, 145.

In some embodiments, the antenna assembly 100 is configured to convectively cool the end components 130, 140 at a convection rate selected to maintain a target temperature of the end components 130, 140 in a target range. For example, the end components 130, 140 may have a core loss (e.g., due to magnetic hysteresis in the end components 130, 140 and in the drive system 150) as a function of temperature that may be minimized at a target temperature (e.g., approximately 80 degrees C.). The antenna assembly 100 can be configured such that at steady state or quasi-steady state operation (e.g., when the rotor 120 is rotating to achieve transmission of the electromagnetic signal at desired frequency, which may including modulating the frequency about the desired frequency), a rate of heat generation due to thermal losses may be balanced by the convection rate at the target temperature. For example, the rate of heat generation may cause the antenna assembly 100 to increase in temperature by approximately 50 degrees C. (e.g., from around room temperature to a steady state or quasi-steady state temperature of around 80 degrees C.), at which temperature the efficiency of the antenna assembly 100 may be maximized or nearly maximized. The convection rate may be selected based on configuring the size of the plurality of extensions 134, 144, the air gaps 135, 145, or other features of the rotor 120 and the end components 130, 140, relative to an expected rate of rotation of the rotor 120.

In operation, the antenna assembly 110 is configured such that the plurality of extensions 134 contact the first rotor end 121, and thus the plurality of extensions 134 contact the plurality of magnets 127 when the plurality of magnets 127 are aligned with the plurality of extensions 134. The antenna assembly 110 can be configured such that the plurality of extensions 144 of the second end component 140 contact the plurality of magnets 127 while the plurality of extensions 134 contact the plurality of magnets 127.

The end components 130, 140 can be permanent magnets. The end components 130, 140 can be made of a ferromagnetic material. For example, the end components 130, 140 can include iron, nickel, cobalt, alloys thereof, or other materials which can act as permanent magnets.

The antenna assembly 110 includes a drive system 150. The drive system 150 is configured to rotate the rotor 120 relative to the end components 130, 140. As the rotor 120 rotates, the magnetic field of the rotor 120 (e.g., the magnetic field corresponding to the plurality of magnets 122) can be modulated. For example, at a particular location, such as a location at which the rotor 120 contacts the first end component 130, a magnitude of the magnetic field of the rotor 120 will increase as a distance between an adjacent magnet 122 (e.g., the magnet 122 closest to the particular location) decreases, and vice versa. In addition, as will be described further herein, the alternating orientation of the magnets 122 enables the direction of the magnetic field to alternate, such that the antenna assembly 110 generates an alternating magnetic field. The drive system 150 can include a plurality of electromagnets 152 configured to output or generate a magnetic field (e.g., a second magnetic field; a driving magnetic field) to drive rotation of the rotor 120. In some embodiments, the drive system 150 is configured to excite the electromagnets 152 by a polyphaser current, causing the electromagnets 152 to generate the second magnetic field to be a multi-polar rotating magnetic field, which can apply a force to the plurality of magnets 122 of the rotor 120 to rotate the magnets 122 and thus the rotor 120. In some embodiments, the rotor 120 defines a rotation axis 124, and the drive system 150 is configured to rotate the rotor 120 about the rotation axis 124.

The drive system may include a shell 151. The shell 151 can be configured to be non-conductive. The shell 151 can be configured to anchor the electromagnets 152. The shell 151 can provide operator safety by shielding unexpected fragmentation of the components of the antenna assembly 100. The shell 151 can be configured to transfer reaction torque of the drive system 150 to the end components 130, 140, such as to prevent twisting of the antenna assembly 100. The shell 151 can be configured to direct airflow from the rotor 120 and along the end components 130, 140, such as to facilitate convective cooling.

Figure 2:
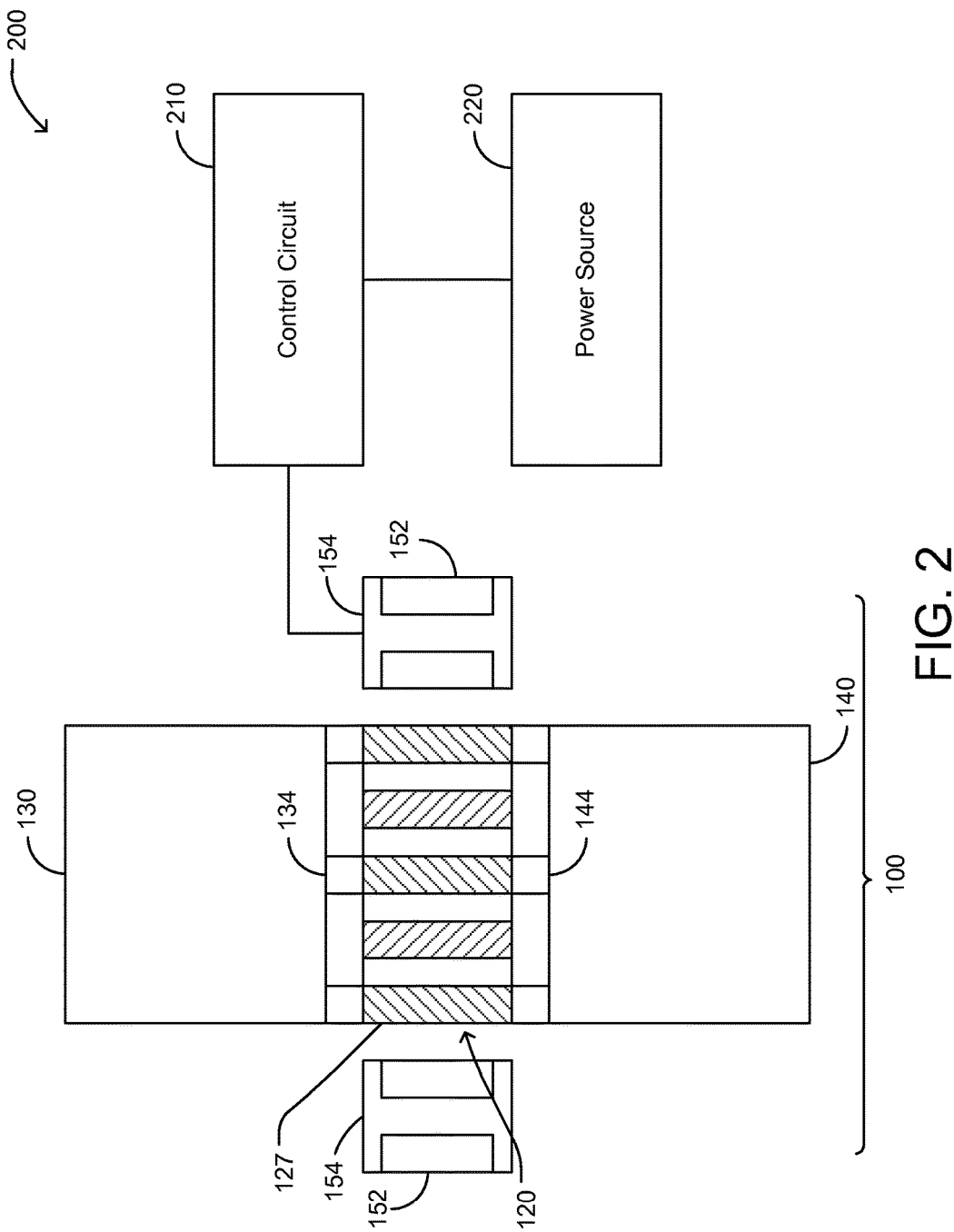
FIG. 2 is a schematic diagram of an exemplary embodiment of an antenna system incorporating the antenna assembly of FIG. 1A.

Referring now to FIG. 2, an antenna system 200 including the antenna assembly 100 is shown according to an exemplary embodiment of the inventive concepts disclosed herein. As shown in FIG. 2, the antenna assembly 100 includes the rotor 120, the first end component 130, the second end component 140, and the drive system 150.

The drive system 150 includes a plurality of electromagnets 152. The electromagnets 152 can include an electromagnetic coil (e.g., copper coil) configured to receive an electric current and output a magnetic field based on the electric current. In some embodiments, the electromagnets 152 surround corresponding ferrite cores 154. For example, each electromagnet 152 can be wound around the corresponding ferrite core 154. The ferrite cores 154 may be configured as C cores.

In some embodiments, the plurality of electromagnets 152 is configured to shunt magnetic flux of the plurality of magnets 127. For example, the plurality of electromagnets 152 can shunt magnetic flux outputted by the magnets 127 which are not coupled to (e.g., not in contact with) corresponding extensions 134, 144 of the end components 130, 140. This may occur when the reluctance to magnetic flux from the magnets 127 (when not coupled to the extensions 134, 144) to the electromagnets 152 is less than the reluctance to magnetic flux from the magnets 127 to the end components 130, 140. In some embodiments, the signal-to-noise ratio of the transmission by the antenna assembly 110 is increased based on the shunting of the magnetic flux by the plurality of electromagnets 152, as the magnitude of out-of-phase signals will decrease.

The antenna system 200 includes a control circuit 210. The control circuit 210 is configured to control operation of the drive system 150. For example, the control circuit 210 can output a control signal for driving an electric current through the drive system 150. The control circuit 210 can include a half-bridge motor drive circuit configured to excite the plurality of electromagnets 152 of the drive system 150, which may enable the antenna system 200 to operate at an efficiency in excess of ninety percent for expected operational power levels and rotational frequencies.

The control circuit 210 can configure the control signal to encode information to be transmitted by the electromagnetic signal outputted by the antenna assembly 100. The control circuit 210 can modulate parameters of the control signal such as frequency to encode information. For example, the control circuit 210 can configured to cause the control signal to be transmitted at a first frequency corresponding to a first signal state (e.g., a bit value of zero for binary signal encoding), and at a second frequency corresponding to a second signal state (e.g., a bit value of one for binary signal encoding). The control circuit 210 can configure the control signal (and thus the drive system 150) to manipulate the electromagnetic signal transmitted by the antenna assembly 100 according to various techniques including amplitude shift keying, frequency shift keying, and phase shift keying.

The antenna system 200 can include or be coupled to a power source 220. The power source 220 can output or generate an electric current. The power source 220 can be a voltage source. The power source 220 can be a portable power device (e.g., a battery), or a grid-based electricity source. The power source 220 can be an electric motor, and may also be configured to operate as a generator (e.g., to recover energy from the rotor 120 when the rotational speed of the rotor 120 decreases). The power source 220 can be controlled by the control circuit 210, such as by the control circuit 210 coupling the power source 220 to a load (e.g., to the drive system 150).

In some embodiments, the antenna system 200 is configured for synchronous operation. The control circuit 210 can output a control signal configured to cause the drive system 150 to rotate at a rotational frequency corresponding to (e.g., equal to) a frequency of the control signal. The rotational frequency can be a function of a carrier frequency for an electromagnetic signal to be transmitted by the antenna assembly 100 (e.g., a carrier signal) and the number of magnets 127. For example, the rotational frequency can be defined as:

$$\alpha = \frac{2*\gamma}{N}$$

where $\alpha$ is the rotational frequency, $\gamma$ is the carrier frequency, and N is the number of magnets 127 (e.g., the rotational frequency is equal to the carrier frequency divided by the number of pairs of north poles and south poles of the magnets 127 divided by two). For example, if the rotor 120 includes 50 magnet pairs, the antenna system 200 may emit an electromagnetic signal at 30 kHz while rotating the rotor at 600 Hz. As compared to existing rotating rare earth magnet systems, which may undergo catastrophic failure due to centripetal forces associated with rotating the high-mass magnets at a desired carrier frequency, embodiments of the inventive concepts disclosed herein can operate at a rotational frequency below at threshold frequency at which failure may occur, yet still achieve carrier frequencies in the ULF and VLF ranges.

The antenna assembly 100 can be configured to generate, output, and/or transmit an electromagnetic signal having a frequency (e.g., carrier frequency) in the VLF range. The VLF range may be greater than or equal to 3 kHz and less than or equal to 30 kHz. The antenna assembly 110 can be configured to generate, output, and/or transmit an electromagnetic signal having a frequency (e.g., carrier frequency) in the ULF range. The ULF may be greater than or equal to 300 Hz and less than or equal to 3 kHz.

In some embodiments, the control circuit 210 is configured to execute frequency modulation of the electromagnetic signal (e.g., modulate the carrier frequency) transmitted by the antenna assembly 100. The control circuit 210 can modulate the carrier frequency by modulating the frequency of the control signal. As the antenna system 200 is configured for synchronous operation, increasing (or decreasing) the frequency of the control signal will increase (or decrease) the rotational frequency of the rotor 120, and thus increase (or decrease) the carrier frequency of the electromagnetic signal transmitted by the antenna assembly 100. As such, the control circuit 210 can shift the carrier frequency by shifting the frequency of the control signal as a function of the desired frequency shift and the number of magnets 127.

In some embodiments, as indicated by the equation above, if N is greater than two, than the rotational frequency $\alpha$ is a fraction of the carrier frequency $\gamma$, and thus the energy required to rotate the rotor 120 is a fraction of what would be required for existing systems. Similarly, the modulation energy per bit of the signal transmitted by the antenna assembly 100 (e.g., the energy required to cause a frequency modulation) is a fraction of what would be required for existing systems. As such, the energy required to shift the frequency from a first value to a second value can be reduced compared to existing systems; similarly, a difference in frequency between the first value and the second value can be increased while using the same amount of energy, which may increase a signal-to-noise ratio of the transmission by the antenna assembly 100.

In some embodiments, the antenna system 200 is configured to recover energy by decreasing the rotational frequency (and thus the carrier frequency). For example, the antenna system 200 can operate as a regenerative braking system, as decreasing the rotational frequency $\alpha$ of the rotor 120 can be achieved by transferring kinetic energy of the rotor 120 to the power source 220. In some embodiments, the net energy required for frequency modulation is zero (or close to zero), as the energy required to increase the frequency from a first value to a second, higher value is recovered when decreasing the frequency from the second value to the first value.

In some embodiments, the control circuit 210 is configured to execute amplitude modulate of the electromagnetic signal transmitted by the antenna assembly 100. It will be appreciated that the amplitude of the electromagnetic signal can depend on the reluctance of the end components 130, 140, and thus the arrangement of the end components 130, 140 relative to the rotor 120 can determine the amplitude of the electromagnetic signal by determining a rate of magnetic flux conduction from the plurality of magnets 127 to the end components 130, 140.

The control circuit 210 can modulate the amplitude of the electromagnetic signal by adjusting an alignment of the first end component 130 relative to the second end component 140. For example, the control circuit 210 can be configured to control operation of a rotational actuator (not shown) coupled to at least one of the first end component 130 or the second end component 140. The rotational actuator can include a motor configured to rotate the end components 130, 140. The control circuit 210 can be configured to cause the rotational actuator to rotate the first end component 130 or the second end component 140 by an angle corresponding to the amplitude modulation. A maximum amplitude of the electromagnetic signal may correspond to the alignment shown in FIGS. 1A-1B, where the plurality of extensions 134 of the first end component 130 are aligned with the plurality of extensions 144 of the second end component 140 (e.g., an axis passing through each extension 134 and parallel to the rotation axis 124 coincides with an axis passing through the corresponding extension 144 and parallel to the rotation axis 124; a volume extending from a rotor-facing surface of each extension 134 coincides with a volume extending from a rotor-facing surface of each extension 144). A minimum amplitude of the electromagnetic signal may occur when the first end component 130 has been rotated relative to the second end component 140 by a maximum modulation angle $\delta$, which can be defined in degrees as:

$$\delta = \frac{360}{2*N}$$

where N is the number magnets 127 of the rotor 120. As such, the amplitude of the electromagnetic signal may be minimized where the first end component 130 (and thus the extensions 134) is at a midpoint of two alignments where the extensions 134 are aligned with the extensions 144. In other words, the electromagnetic signal may be minimized where the end components 130, 140 have the greatest misalignment. Where the misalignment is greatest, the effective reluctance of the end components 130, 140 for receiving the magnetic field of the magnets 127 will be greatest, thus minimizing the magnetic flux conducted through the end components 130, 140, and thus minimizing the magnitude of the electromagnetic signal transmitted by the end components 130, 140.

In some embodiments, the control circuit 210 is configured to encode a chirp in the electromagnetic signal based on a rate of frequency modulation. The chirp can correspond to a duration in which the electromagnetic signal increases from a first value to a second value (e.g., chirp "up") or decreases from the second value to the first value (e.g., chirp "down"). The control circuit 210 can configure a control signal for operating the antenna assembly 100 based on a rotational inertia associated with rotation of the rotor 120 to determine the chirp length (e.g., as the rotational inertia of the rotor 120 increases, there may be a greater delay associated with increasing or decreasing the rotational frequency and thus the carrier frequency of the antenna assembly 100). For example, based on known parameters of the antenna assembly 100 such as a mass of the rotor 120 and a current rate of rotation of the rotor 120, the control circuit 210 can retrieve or calculate a rate of change for the frequency of the control signal configured to cause a corresponding chirp duration for the electromagnetic signal outputted by the antenna assembly. The control circuit 210 can similarly retrieve or calculate time durations for frequency modulation.

The control circuit 210 can also modulate the amplitude of the electromagnetic signal transmitted by the antenna assembly 100 by increasing a distance between at least one of the first end component 130 or the second end component 140 relative to the rotor 120 (or increasing a distance of one or more of the respective extensions 134, 144 thereof relative to the rotor 120). As the distance between the extensions 134 and/or the extensions 144 and the rotor 120 increases, the rate of magnetic flux conduction into the corresponding end component will decrease, and thus the magnitude of the electromagnetic signal transmitted by the corresponding end component will decrease. The control circuit 210 can be configured to control operation of a linear actuator (not shown) to modify the distances between the extensions 134 and/or the extensions 144 and the rotor 120.

Figure 3:
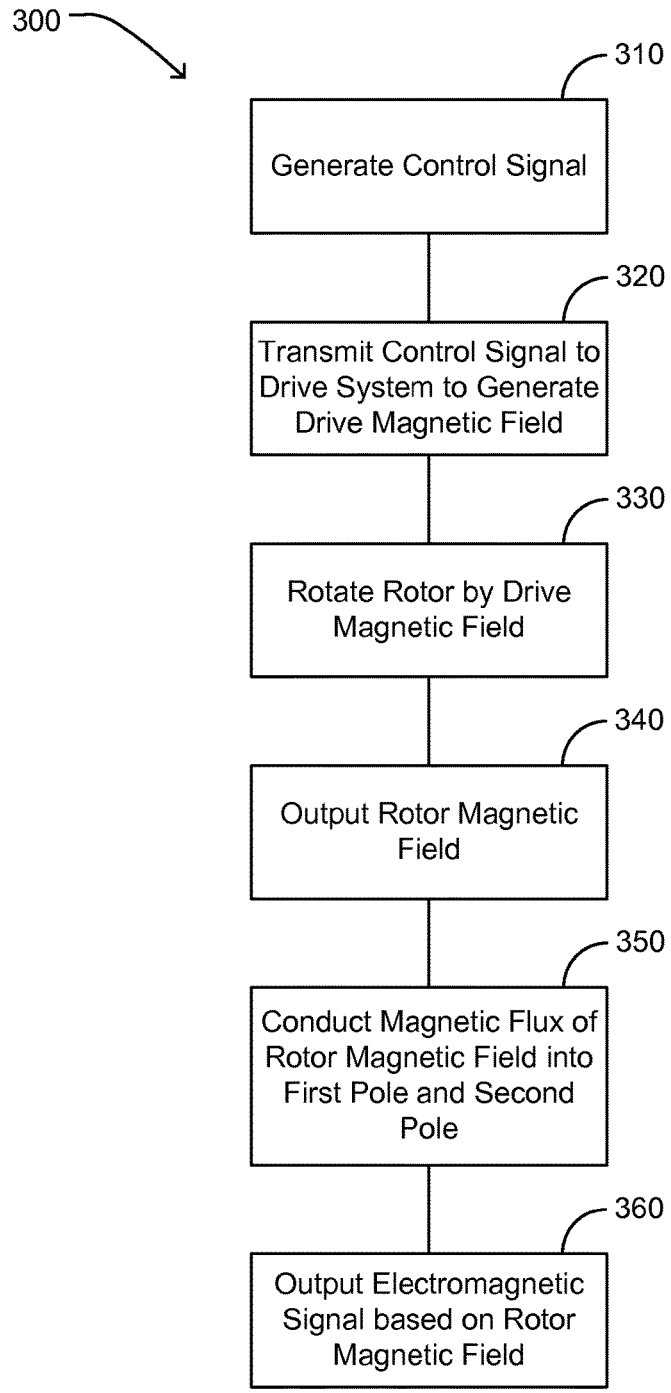
FIG. 3 is a flow chart of an exemplary embodiment of a method of operating an antenna system according to the inventive concepts disclosed herein.

Referring now to FIG. 3, an exemplary embodiment of a method 300 according to the inventive concepts disclosed herein may include the following steps. The method 300 may be performed using various hardware, apparatuses, and systems disclosed herein, such as the antenna assembly 100 or the antenna system 200.

A step (310) may include generating a control signal by a control circuit. The control circuit can be generated to encode information in the control signal, such as by manipulating the frequency, amplitude, or phase of the control signal.

A step (320) may include transmitting the control signal to a drive system to generate a drive magnetic field. The drive system may include a plurality of electromagnets configured to generate the drive magnetic field based on a received electric current. The control signal may include the electric current, or may cause a power source to transmit an electric current to the plurality of electromagnets based on the control signal.

A step (330) may include rotating a rotor by the drive magnetic field. The rotor may include or be associated with a plurality of magnets (e.g., rare earth magnets) which can be driven to rotate the rotor based on the drive magnetic field. The plurality of magnets may be disposed to extend from a first end of the rotor to a second end of the rotor along an exterior surface of the rotor, and to extend radially inward into a body of the rotor. The plurality of magnets may be arranged to have opposite polar orientations (e.g., a first set of the plurality of magnets may have a north pole at the first end of the rotor, and a second set of the plurality of magnets may have a south pole at the first end of the rotor, such that each north pole is adjacent to a south pole on either side).

A step (340) may include outputting a rotor magnetic field. The rotor magnetic field may be outputted by the plurality of magnets of the rotor. A step (350) may include conducting magnetic flux of the rotor magnetic field into a first end component and a second end component. The end components may be of a ferromagnetic material. The end components may include extensions configured to conduct magnetic flux from the plurality of magnets of the rotor, while spacing a remaining portion of the end components from the rotor by corresponding air gaps.

A step (360) may include outputting an electromagnetic signal based on the rotor magnetic field. As the rotor is rotated based on the control signal, the direction of the magnetic flux conducted into the end components may alternate based on the alternating orientations of the plurality of magnets of the rotor. The electromagnetic signal may be modulated based on modulation of the control signal generated by the control circuit for driving the drive system.

As will be appreciated from the above, systems and methods for a switched reluctance magnetic mechtenna according to the inventive concepts disclosed herein may enable VLF and ULF transmissions in a more practical form factor than existing trailing antenna systems, while preventing mechanical failures associated with rotation of existing permanent magnet systems.

It is to be understood that embodiments of the methods according to the inventive concepts disclosed herein may include one or more of the steps described herein. Further, such steps may be carried out in any desired order and two or more of the steps may be carried out simultaneously with one another. Two or more of the steps disclosed herein may be combined in a single step, and in some embodiments, one or more of the steps may be carried out as two or more sub-steps. Further, other steps or sub-steps may be carried out in addition to, or as substitutes to one or more of the steps disclosed herein.

From the above description, it is clear that the inventive concepts disclosed herein are well adapted to carry out the objects and to attain the advantages mentioned herein as well as those inherent in the inventive concepts disclosed herein. While presently preferred embodiments of the inventive concepts disclosed herein have been described for purposes of this disclosure, it will be understood that numerous changes may be made which will readily suggest themselves to those skilled in the art and which are accomplished within the broad scope and coverage of the inventive concepts disclosed and claimed herein.

What is claimed is:

1. An antenna assembly, comprising:
   a rotor comprising a first rotor end and a second rotor end;
   a plurality of magnets associated with the rotor, the plurality of magnets configured to output a first magnetic field, a first set of the plurality of magnets having a north pole adjacent to the first rotor end, a second set of the plurality of magnets having a south pole adjacent to the first rotor end, the first set and the second set arranged in an alternating order about the rotor;

a first end component comprising a first end component body and a plurality of first extensions extending from the first end component body, the first end component comprising a ferromagnetic material, the first end component disposed such that the plurality of first extensions are spaced from the first set of the plurality of magnets by a first distance less than a first threshold; and a second end component comprising a second end component body and a plurality of second extensions extending from the second end component body, the second end component comprising a ferromagnetic material, the second end component disposed such that the plurality of second extensions are spaced from the first set of the plurality of magnets by a second distance less than the first threshold, the first end component and second end component configured to output an electromagnetic signal based on the first magnetic field.

2. The antenna assembly of claim 1, wherein the rotor includes a non-ferromagnetic material, and the plurality of magnets include a rare earth material including at least one of an element in the lanthanide series, scandium, or yttrium.

3. The antenna assembly of claim 1, wherein the rotor defines a plurality of slots, each slot extending radially inward from an exterior surface of the rotor, each magnet of the plurality of magnets disposed in a corresponding slot.

4. The antenna assembly of claim 1, further comprising a drive system including an electromagnetic system configured to output a second magnetic field to drive rotation of the rotor relative to the first end component and the second end component, and a drive control circuit configured to control operation of the electromagnetic system based on a control signal.

5. The antenna assembly of claim 4, wherein the drive control circuit is configured to control an electric current flowing through the electromagnet system to modulate the second magnetic field.

6. The antenna assembly of claim 4, wherein the electric current is polyphasic.

7. The antenna assembly of claim 4, wherein the control signal is configured to cause the first end component and second end component to output the electromagnetic signal at a frequency in the very low frequency or ultra low frequency range.

8. The antenna assembly of claim 4, wherein the electromagnetic system includes a plurality of electromagnets oriented parallel to an axis of rotation of the rotor and spaced radially outward from the rotor.

9. The antenna assembly of claim 8, wherein the drive control circuit includes a half-bridge motor drive circuit configured to excite the plurality of electromagnets.

10. The antenna assembly of claim 8, wherein each electromagnet surrounds a corresponding ferrite core, the electromagnet system configured to shunt magnetic flux of the first set of the plurality of magnets.

11. The antenna system of claim 4, wherein the drive control circuit is configured to encode information to be transmitted by the electromagnetic signal using the control signal.

12. The antenna assembly of claim 1, wherein the rotor is configured to rotate at a rotation frequency that is a function of a carrier frequency and the number of magnets, the carrier frequency in the very low frequency range or ultra-low frequency range.

13. The antenna assembly of claim 12, wherein a direction of the electromagnetic signal alternates as a function of an angular position of the rotor.

14. The antenna assembly of claim 1, wherein the first distance and the second distance are zero.

15. An antenna system, comprising:
a rotor comprising a first rotor end and a second rotor end;
a plurality of magnets associated with the rotor, the plurality of magnets configured to output a first magnetic field, a first set of the plurality of magnets having a north pole adjacent to the first rotor end, a second set of the plurality of magnets having a south pole adjacent to the first rotor end, the first set and the second set arranged in an alternating order about the rotor;
a first end component comprising a ferromagnetic material;
a second end component comprising a ferromagnetic material, the first end component and second end component configured to output an electromagnetic signal based on the first magnetic field; and
a drive system including an electromagnetic system configured to output a second magnetic field to drive rotation of the rotor relative to the first end component and the second end component, and a drive control circuit configured to control operation of the electromagnetic system based on a control signal.

16. The antenna system of claim 15, wherein the drive control circuit is configured to modulate a frequency or an amplitude of the electromagnetic signal based on the control signal.

17. The antenna system of claim 15, wherein the drive control circuit is configured to recover energy by decreasing a frequency of the second magnetic field.

18. A method of generating an electromagnetic signal, comprising:
generating a control signal having a signal frequency;
transmitting the control signal to a drive system having a plurality of electromagnets to cause the drive system to pass an electric current through the plurality of electromagnets at a rotational frequency corresponding to the signal frequency to generate a drive magnetic field;
rotating a rotor using the drive magnetic field, the rotor associated with a plurality of magnets, a first set of the plurality of magnets having a north pole adjacent to a first rotor end of the rotor, a second set of the plurality of magnets having a south pole adjacent to a second rotor end of the rotor;
outputting a rotor magnetic field by the plurality of magnets;
conducting magnetic flux of the rotor magnetic field through a plurality of extensions into a first end component and a second end component; and
outputting an electromagnetic signal based on the rotor magnetic field.

19. The method of claim 18, further comprising causing frequency modulation of the electromagnetic signal based on frequency modulation of the control signal.

20. The method of claim 18, wherein the electromagnetic signal is in the very low frequency range or ultra-low frequency range.

* * * * *